United States Patent
Porte et al.

(10) Patent No.: US 8,991,054 B2
(45) Date of Patent: Mar. 31, 2015

(54) PROCESS FOR THE PRODUCTION OF A PANEL FOR THE ACOUSTIC TREATMENT INCORPORATING THE FROST TREATMENT FUNCTION WITH HOT AIR

(75) Inventors: Alain Porte, Colomiers (FR); Frederic Chelin, Encausse (FR); Gregory Albet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 270 days.

(21) Appl. No.: 13/527,192

(22) Filed: Jun. 19, 2012

(65) Prior Publication Data

US 2012/0317782 A1 Dec. 20, 2012

(30) Foreign Application Priority Data

Jun. 20, 2011 (FR) ...................................... 11 55381

(51) Int. Cl.
*B64D 15/04* (2006.01)
*B64D 33/02* (2006.01)
*F02C 7/045* (2006.01)
*F02C 7/047* (2006.01)

(52) U.S. Cl.
CPC ............... *B64D 15/04* (2013.01); *B64D 33/02* (2013.01); *F02C 7/045* (2013.01); *F02C 7/047* (2013.01); *B64D 2033/0206* (2013.01); *B64D 2033/0233* (2013.01); *Y02T 50/672* (2013.01)
USPC ............................. 29/897.2; 29/505; 29/557

(58) Field of Classification Search
CPC C04B 38/0006; C04B 35/195; C04B 35/565; B32B 3/12
USPC ......................................... 29/897.2; 426/116
See application file for complete search history.

(56) References Cited

U.S. PATENT DOCUMENTS

| 3,516,895 | A |   | 6/1970 | Hartman |
| 4,984,732 | A | * | 1/1991 | Hudson et al. ............. 228/173.2 |
| 2003/0203816 | A1 | * | 10/2003 | Sangiovanni et al. ........ 502/439 |
| 2005/0147790 | A1 |   | 7/2005 | Levavasseur |

(Continued)

FOREIGN PATENT DOCUMENTS

| EP | 1 376 534 A1 | 1/2004 |
| FR | 2 917 067 A1 | 12/2008 |

(Continued)

OTHER PUBLICATIONS

French Search Report, dated Jan. 18, 2012, from corresponding French application.

*Primary Examiner* — Alexander P Taousakis
*Assistant Examiner* — Lee A Holly
(74) *Attorney, Agent, or Firm* — Young & Thompson

(57) ABSTRACT

A process for the production of an acoustic treatment panel that can be connected at a surface of an aircraft, in particular at a leading edge such as an air intake of an aircraft nacelle, whereby the panel includes an acoustically resistive layer (24), at least one alveolar structure (26), and a reflective layer (28), and channels (30) placed between the alveolar structure and the acoustically resistive layer, each channel being bordered by a wall (32), the process including deforming a layer so as to produce furrows at one of its surfaces, flattening and making integral the deformed layer (34) with the acoustically resistive layer so as to border the channels, and removing material in such a way as to eliminate at least a portion of the thickness of the deformed layer (34) in which the furrows are formed between the channels, prior to the assembly of the alveolar structure.

20 Claims, 4 Drawing Sheets

(56) References Cited

U.S. PATENT DOCUMENTS

Figure 1:
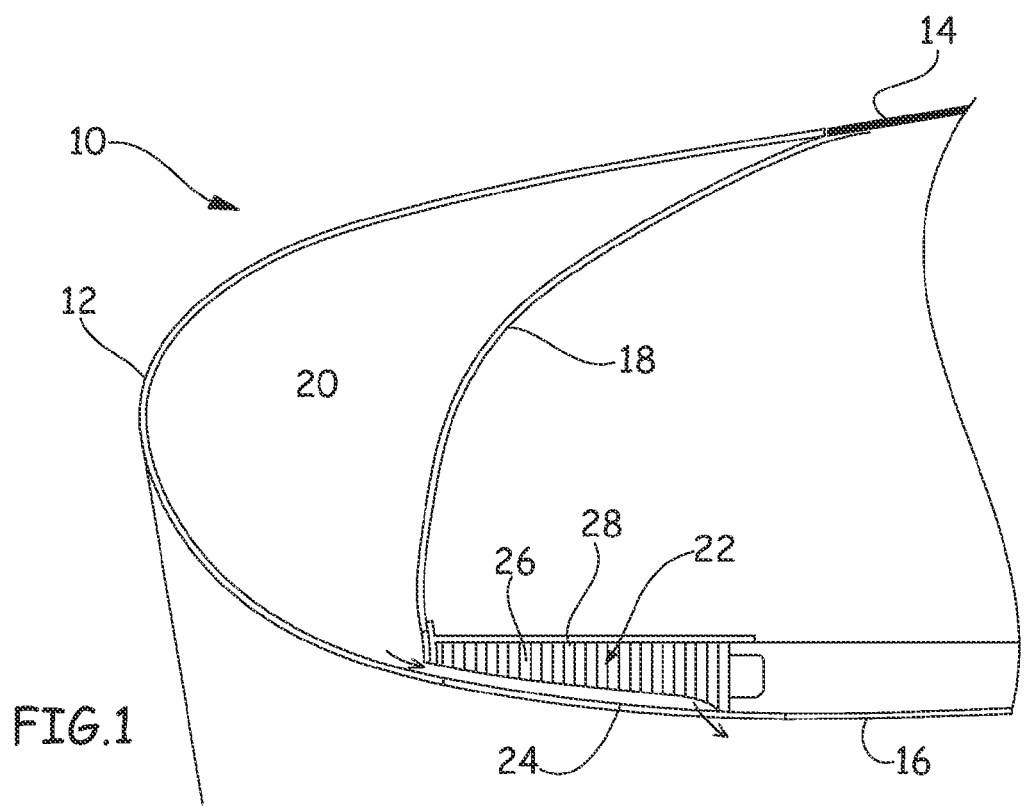

2010/0021578 A1* 1/2010 Coleman et al. .................. 425/3
2010/0181420 A1* 7/2010 Porte et al. .................... 244/1 N

FOREIGN PATENT DOCUMENTS

| WO | WO 2009001002 A1 * | 12/2008 |
| WO | 2010/012988 A1 | 2/2010 |

* cited by examiner

PROCESS FOR THE PRODUCTION OF A PANEL FOR THE ACOUSTIC TREATMENT INCORPORATING THE FROST TREATMENT FUNCTION WITH HOT AIR

BACKGROUND OF THE INVENTION

1. Field of the Invention

This invention relates to a process for the production of an acoustic treatment panel that integrates the function of frost treatment with hot air, whereby said panel is designed in particular for a leading edge of an aircraft, and more particularly for an air intake of an aircraft nacelle.

2. Description of the Related Art

Such a panel is described in particular in the patent FR-2,917,067. It comprises—from the outside to the inside—an acoustically resistive layer, at least one alveolar structure, and a reflective layer, as well as channels that are each bordered by a wall that is inserted between the acoustically resistive layer and the alveolar structure.

This solution makes it possible to limit the risks of communication between the inside of the channels and the cells of the alveolar structure and therefore the risks of disruptions of acoustic treatment.

According to another advantage, the hot air occupies a volume that is considerably smaller relative to the prior solutions, according to which it occupies the volume of certain cells of the alveolar structure, which makes it possible to produce, on the one hand, a better concentration of hot air against the wall to be defrosted, reinforcing the effectiveness of defrosting, and, on the other hand, a higher pneumatic pressure that limits the risk of the pressure inside the structure being lower than that of the outside and therefore the penetration of the outside air inside the defrosting system.

According to another advantage, the hot air is in permanent contact with the skin to be defrosted, which makes it possible to improve the exchanges and to reduce the temperature of the hot air that is delivered at the outlet of the defrosting system; this makes it possible to discharge the air without the risk of the wall that it passes through being burned, in particular when this wall is made of a heat-sensitive material such as a composite.

According to a first embodiment that is described in the patent FR-2,917,067, the acoustically resistive layer comes in the form of a first piece of sheet metal. To form the channels, a second piece of sheet metal is shaped in such a way as to produce furrows, and then it is flattened and made integral with the inside surface of the first piece of sheet metal. Next, perforations are made in the two pieces of sheet metal in the areas where they are in contact. In parallel, a first surface of the alveolar structure is made integral with the reflective layer. The other surface of the alveolar structure is cut out in such a way as to form—at said surface—shapes that are complementary to those of the channels. Next, the alveolar structure is made integral with the second layer that borders the channels.

This operating mode makes it possible to simplify the assembly mode because the walls that border all of the channels are connected to one another and originate from the shaping of a single piece of sheet metal.

However, the superposition of two pieces of sheet metal at the perforations leads to having perforations with relatively long lengths, which impacts the operation of the acoustic treatment and makes it less efficient.

According to another drawback, it is difficult to obtain satisfactory sealing between the pipes of the alveolar structure that empty out facing the channels because it is relatively difficult to weld the ends of the pipes with a surface that is not flat and has a complex shape.

According to another operating mode that is described in the patent FR-2,917,067, each channel comes in the form of a strip of shaped material. According to this variant, the strips of material that border the channels are flattened and individually made integral with the inside surface of the first piece of sheet metal.

To ensure the passage of sound waves, the acoustically resistive layer can comprise a cloth that may or may not be metal, such as a wire mesh, and at least one structural layer, for example, sheet metal or a composite with oblong holes or microperforations.

In parallel, a first surface of the alveolar structure is made integral with the reflective layer. The other surface of the alveolar structure is cut out in such a way as to form—at said surface—shapes that are complementary to those of the channels. Next, the alveolar structure is made integral with the second layer that borders the channels.

This operating mode does not impact the operation of the acoustic treatment to the extent that the strips used for forming the channels separate the acoustically resistive layer in the areas that are provided for the acoustic treatment.

However, the installation of the material strips that border the channels on the acoustically resistive layer takes a relatively long time to carry out, especially since the connection between the edges of the strips and the acoustically resistive layer is to be airtight so as not to disrupt the acoustic and/or frost treatments.

According to another drawback, as above, it is difficult to obtain satisfactory sealing between the pipes of the alveolar structure that empty out facing the channels because it is relatively difficult to weld the ends of the pipes with a surface that is not flat and that has a complex shape.

SUMMARY OF THE INVENTION

Also, the purpose of this application is to remedy the drawbacks of the prior art by proposing a process for the production of an acoustic treatment panel that integrates the function of frost treatment by hot air, making it possible to simplify the mode of assembly and to produce a panel that is efficient in terms of both acoustic treatment and frost treatment.

For this purpose, the invention has as its object a process for the production of an acoustic treatment panel that can be connected at a surface of an aircraft, in particular at a leading edge such as an air intake of an aircraft nacelle, whereby said panel comprises an acoustically resistive layer, at least one alveolar structure, and a reflective layer, as well as channels placed between said alveolar structure and the acoustically resistive structure, with the channels each being bordered by a wall, with said process consisting in deforming a layer so as to produce furrows at one of its surfaces, in flattening and making integral said deformed layer with the acoustically resistive layer in such a way as to border the channels, characterized in that it consists in removing material in such a way as to eliminate at least a portion of the thickness of the layer in which the furrows are formed between the channels, prior to the assembly of the alveolar structure.

BRIEF DESCRIPTION OF THE DRAWING FIGURES

Figure 2:
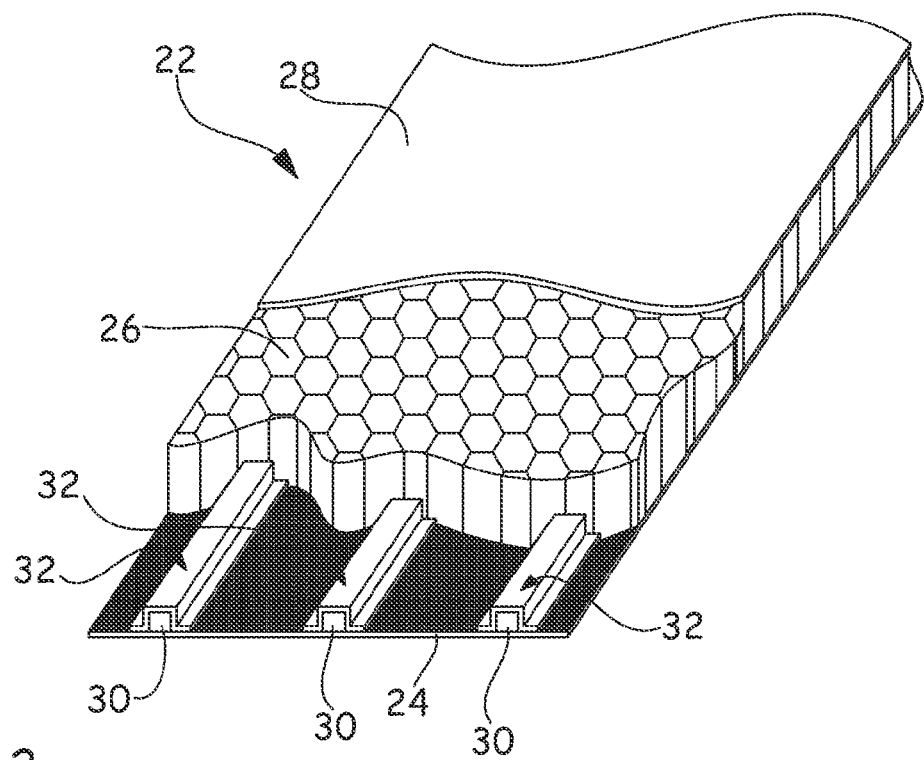
Figure 3A:
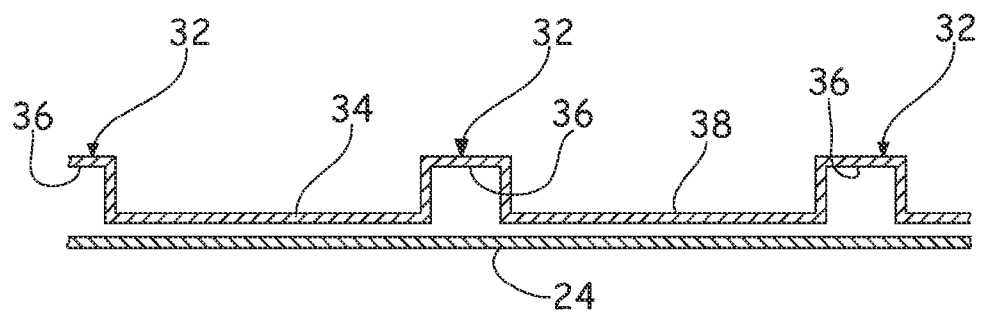
Figure 3B:
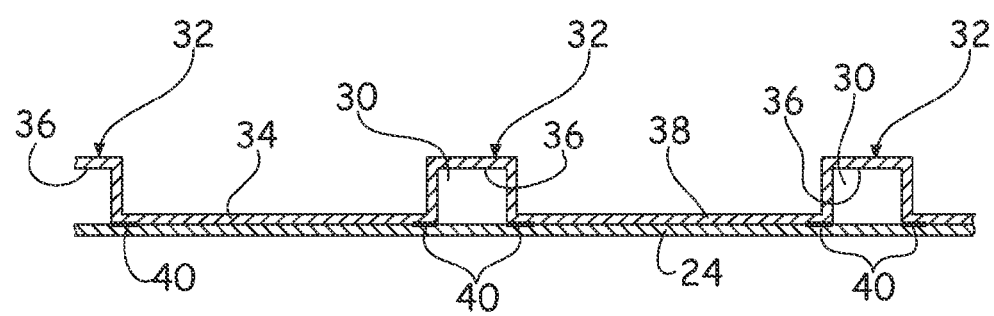
Figure 3C:
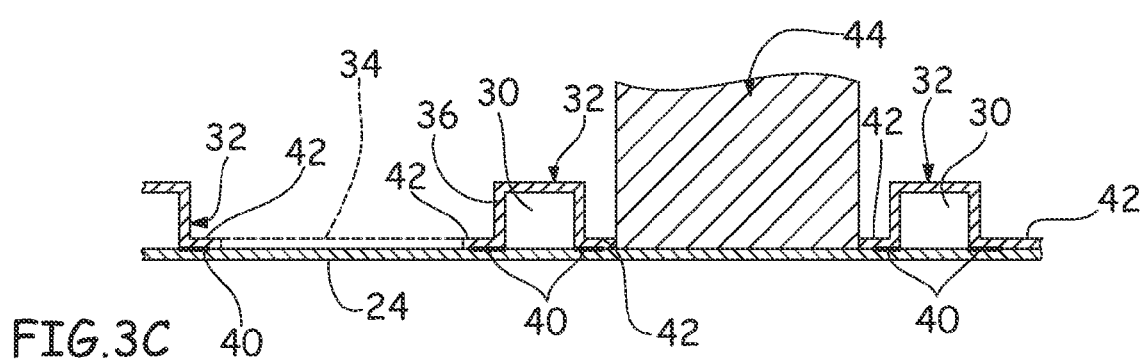
Figure 3D:
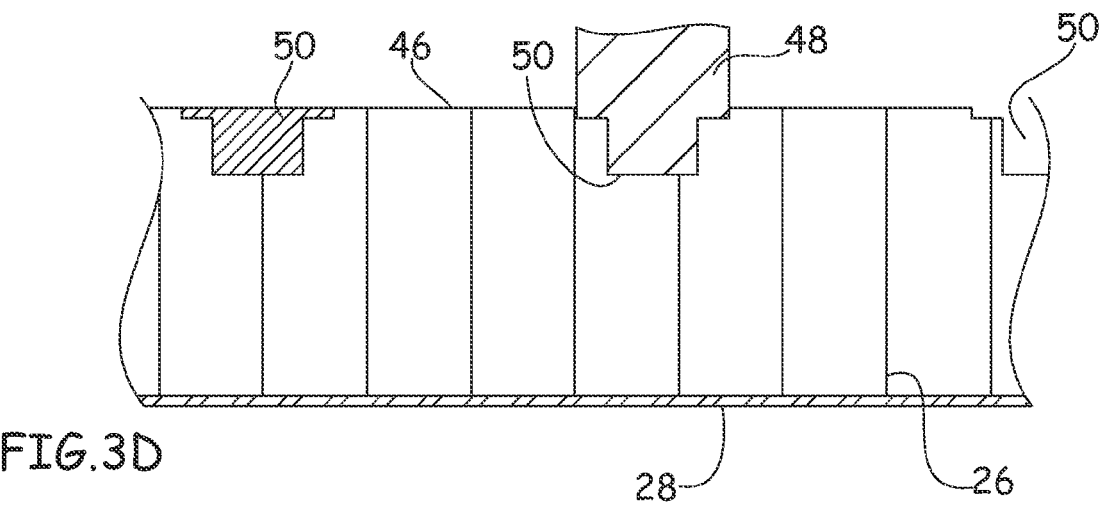
Figure 4A:
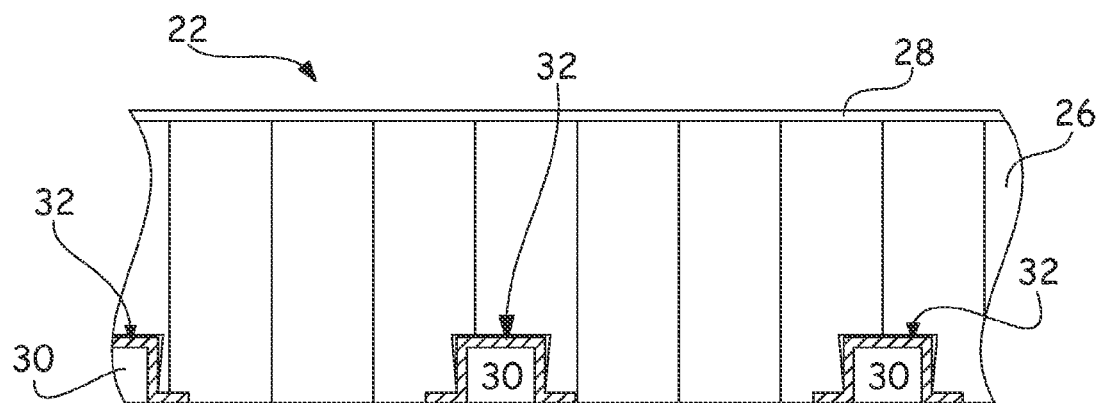
Figure 4B:
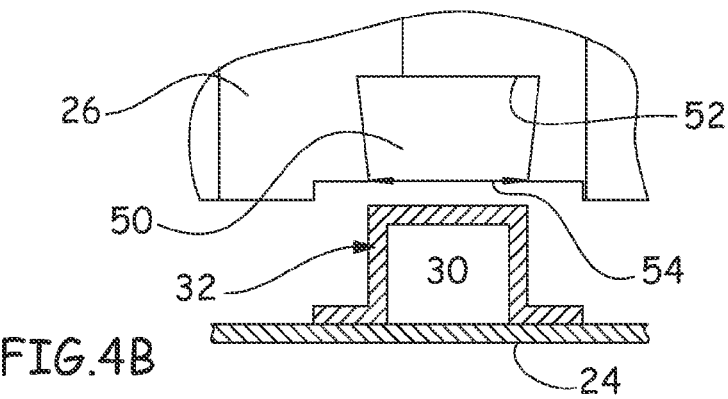
Figure 5A:
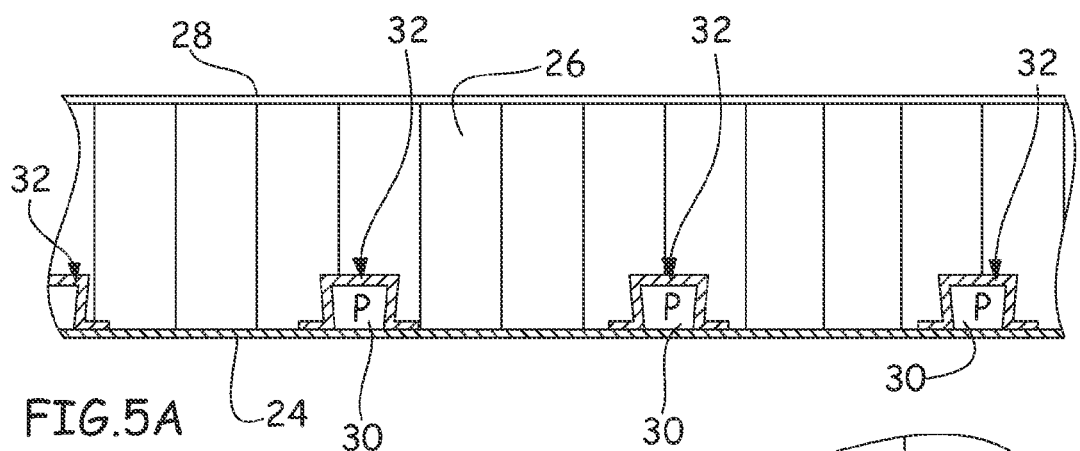
Figure 5B:
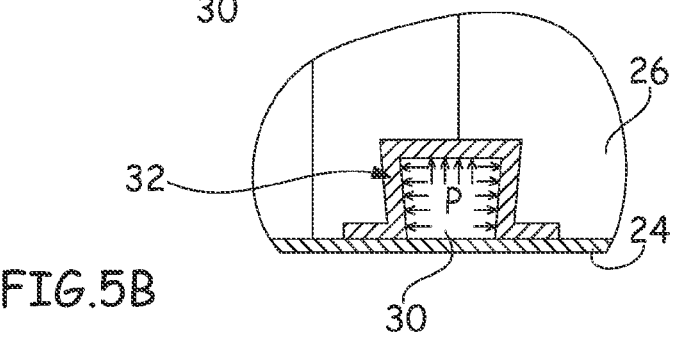
Figure 6:
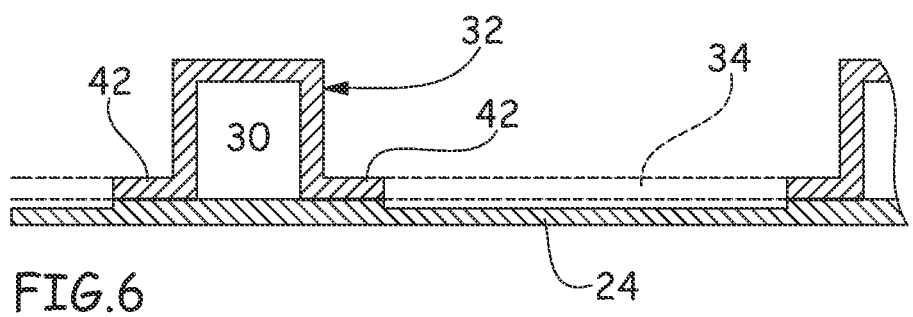
Figure 7:
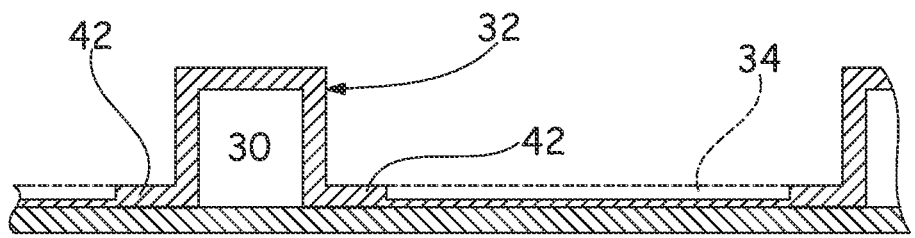

Other characteristics and advantages will emerge from the following description of the invention, a description that is provided only by way of example, with regard to the accompanying drawings, in which:

FIG. 1 is a cutaway of a portion of an air intake of a nacelle of an aircraft incorporating an acoustic treatment panel that integrates the function of frost treatment, FIG. 2 is a perspective view of a portion of an acoustic treatment panel that integrates the function of frost treatment, FIGS. 3A to 3D are cutaways that illustrate the stages of a process for the production of an acoustic treatment panel that integrates the function of frost treatment according to the invention, FIG. 4A is a cutaway that illustrates a first phase of the assembly stage of a panel according to the invention, FIG. 4B is a cutaway that illustrates a detail of FIG. 4A, FIG. 5A is a cutaway that illustrates a second phase of the assembly stage of a panel according to the invention, FIG. 5B is a cutaway that illustrates a detail of FIG. 5A, and FIGS. 6 and 7 are cutaways that illustrate variants of the invention.

DETAILED DESCRIPTION OF THE INVENTION

This invention is now described as applied to an air intake of a propulsion system of an aircraft. However, it can apply to various leading edges of an aircraft where acoustic treatment and frost treatment are combined, for example the leading edges of the wings.

As illustrated in FIG. 1, an air intake 10 of an aircraft nacelle comprises, at the front, a lip 12 of which a first end is extended toward the rear by an outside wall 14 and of which the other end is extended through a pipe 16 that can channel an air flow in the direction of the power plant. A front frame 18 connects the outside wall 14 and the pipe 16 and with the lip 12 borders an annular pipe 20.

To limit the impact of noise pollution, a panel 22 whose purpose is to absorb a portion of the sound energy, in particular by using the principle of Helmholtz resonators, is provided in particular at aerodynamic surfaces. In a known manner, this acoustic treatment panel, also called acoustic coating, comprises—from the outside to the inside—an acoustically resistive structure 24, at least one alveolar structure 26, and a reflective layer 28.

Layer or structure is defined as one or more layers that may or may not be of the same type.

The acoustically resistive structure 24 is a porous structure that has a dissipative role, partially transforming the acoustic energy of the sound wave that passes through it into heat.

According to one embodiment, the acoustically resistive structure 24 comprises at least one porous layer in the form of, for example, a cloth that may or may not be metal, such as a wire mesh, and at least one structural layer, for example, sheet metal or a composite with oblong holes or microperforations.

In all of the cases, the acoustically resistive layer 24 comprises openings that make it possible for the acoustic waves to pass through it.

The reflective structure 28 is impermeable to sound waves.

The alveolar structure 26 corresponds to a volume that is bordered by, on the one hand, a first imaginary surface to which the reflective layer 28 can be connected, and, on the other hand, a second imaginary surface to which the acoustically resistive layer 24 can be connected.

The distance that separates the first imaginary surface and the second imaginary surface cannot be constant.

The alveolar structure 26 comprises a number of pipes that empty out, on the one hand, at the first surface, and, on the other hand, at the second surface. These pipes are sealed by, on the one hand, the acoustically resistive porous structure 24, and, on the other hand, the reflective layer 28, so as to each form a cell.

Preferably, two adjacent pipes are separated by a side wall.

According to an embodiment, the alveolar structure 26 consists of a honeycomb. Thus, the pipes have a hexagonal shape, and the adjacent pipes are separated by side walls.

As a variant, the pipes of the alveolar structure can have other shapes, for example they can have a square cross-section.

These different layers and structures are not described in more detail because they are known to one skilled in the art.

To limit the formation of frost or to prevent its accumulation, the air intake 10 can comprise means for treating frost, using hot air that is taken from the engine to heat the aerodynamic surface. Hereinafter, frost will be defined both as frost and ice, of all types, all structures, and all thicknesses.

In the case of an air intake that incorporates a frost treatment with hot air, a panel 22 that is designed according to the invention can be arranged at the lip, more particularly in the annular pipe 20 at the front of the front frame 18, or it can be placed at the pipe 16, at the rear of the front frame 18.

According to the invention, the acoustic panel 22 comprises pipes or channels 30 that are placed between the alveolar structure 26 and the acoustically resistive structure 24, whereby the channels 30 are each delimited by a wall 32 that is separate from the walls of the alveolar structure 26 and whereby one of the ends of the pipes 30 is connected to a hot air intake.

In the different figures, the panel 24 is shown along a cutaway that is transverse to the direction of the channels 30. According to a layout, the channels 30 extend in the longitudinal direction of the nacelle.

According to the invention, the channels 30 are produced by the shaping of a layer 34 so as to produce—at one of its surfaces—hollow shapes that form furrows 36 in such a way as to border a portion of the channels 30, as illustrated in FIG. 3A. The furrows may or may not be rectilinear and have constant or variable cross-sections over their lengths.

According to one embodiment, the layer 34 is a metal sheet 38, made of a titanium alloy, for example.

To produce castellated shapes, the piece of sheet metal 38 is shaped by preferably using a superplastic shaping technique. As a variant, the piece of sheet metal 38 can be shaped by any other shaping technique.

Next, the layer 34 with the furrows 36 is flattened and made integral with the inside surface of the acoustically resistive layer 24 in such a way as to produce the channels 30, as illustrated in FIG. 3B.

The technique that is used to ensure the connection between the layer 34 and the acoustically resistive layer 24 essentially depends on the materials of the two layers 34 and 24.

According to one embodiment, it is possible to use a welding technique, in particular by ultrasound. However, other techniques for ensuring the assembly of the two layers 24 and 34 can be used, such as, for example, bonding.

Regardless of the technique used, it is important that the edges 40 coming on either side of the furrows 36 of the layer 34 are both made integral with the layer 24 by a continuous line in such a way as to ensure satisfactory sealing between the channels 30 and the rest of the panel 22.

Next, according to an important characteristic of the invention, a removal of material in such a way as to eliminate at least a portion of the thickness of the layer 34 is carried out between the channels 30. According to a first variant that is illustrated in FIG. 3C, between the channels, the entire thickness of the layer 34 is removed, and the thickness of material through which acoustic waves can pass is equal to the thickness of the acoustically resistive layer that is sized in an optimal way for the acoustic treatment. In addition, the fact that the walls 32 that border the channels are connected and come from the same layer 34 makes it possible to simplify the assembly of the elements that border said channels.

According to another variant that is illustrated in FIG. 6, between the channels, the entire thickness of the layer 34 and a slight thickness of the layer 24, preferably less than 25%, are removed. In this case, the thickness of material through which the acoustic waves can pass is slightly smaller than the thickness of the acoustically resistive layer.

According to another variant that is illustrated in FIG. 7, between the channels, only a portion of the thickness of the layer 34, preferably more than 75%, is removed. In this case, the thickness of material through which the acoustic waves can pass is slightly larger than the thickness of the acoustically resistive layer.

Preferably, for each channel, two lugs 42 that are essentially parallel to the layer 24 on either side of the furrows 36 are preserved so that for each channel, the connection between the remainder of the layer 34 and the acoustically resistive layer 24 is resistant and airtight. Advantageously, the lugs 42 have a length of between 2 and 10 mm to obtain a good compromise between a resistant and airtight connection while preserving the maximum functional surface on the acoustic level.

The removal of material can be done by any suitable means, in particular by water jet, for example. Diagrammatically at 44, FIG. 3C shows means for removing the material.

According to the variants, the openings that make it possible for waves to pass through the acoustically resistive layer can be made in said acoustically resistive layer 24 before assembly with the layer 34, can be made in the layers 24 and 34 after assembly but before the removal of material, or can be made in said acoustically resistive layer 24 after assembly and removal of material.

In parallel, the alveolar structure 26 and the reflective layer 28 are assembled, and a removal of material is carried out at the surface 46 of the alveolar structure 26 that can be flattened against the acoustically resistive layer 24, as illustrated in FIG. 3D. Diagrammatically at 48, this figure shows the means for removing the material, such as, for example, a milling cutter. The assembly stage and the means that are used for removing the material are not presented in more detail because they are known to one skilled in the art.

After this stage, the surface 46 comprises cut-outs 50 that can each accommodate a channel 30.

As illustrated in FIG. 4A, the surface 46 of the alveolar structure 26 is flattened against the inside surface of the acoustically resistive layer 24.

Prior to this docking stage, the parts are prepared for undergoing a diffusion welding stage, for example with the aid of chemical descaling.

After this docking stage, the assembly of the alveolar structure with the unit formed by the acoustically resistive layer 24 and the channels 30 is initiated with the aid of a diffusion welding technique.

For this purpose, at least the areas to be assembled—namely the ends of the cells of the alveolar structure 26, the acoustically resistive layers 24, and the walls 32 that border the channels 30—are brought to a temperature that is higher than a given threshold. Concomitantly, a pressurized gas is injected into the channels 30 whose purpose is to produce an expansion of the walls 32 of the channels so as to flatten them against the ends of the cells of the alveolar structure 26, as illustrated in FIGS. 5A and 5B. Advantageously, a compressive force is exerted simultaneously whose purpose is to flatten the acoustically resistive layer 24 against the surface 46 of the alveolar structure 26.

The combination of the elevation of temperature and pressure leads to producing a continuous weld at the ends of the cells of the alveolar structure that are thus airtight with one another.

Of course, the temperature threshold and the minimum pressures depend on the materials that are used and more particularly their rheological characteristics relative to the superplasticity.

By way of example, for elements with a titanium alloy base, the temperature should reach 900° C. at the welding zones.

According to another advantage, this solution makes it possible to compensate for the geometric defects of cut-outs 50 and walls 32 that delimit the channels 30. Actually, the wall 32 can expand in a different way from one point to the next until coming into contact with the ends of the cells of the alveolar structure.

Advantageously, each cut-out 50 has an undercut shape as illustrated in FIGS. 4A and 4B. Each cut-out 50 comprises a cross-section with a bottom 52 and an opening 54 via which a channel 30 is introduced.

According to an illustrated embodiment, the cut-out 50 has a dovetail shape. However, the largest width of the cut-out is not necessarily provided at the bottom.

According to this variant, during the assembly phase, a deformation is made at the same time according to a superplastic shaping technique and diffusion welding.

Thus, during assembly, the walls 32 of the channels 30, which do not necessarily have an undercut shape initially, expand in such a way as to assume the shapes of the cut-outs 50. Thus, after assembly, the walls 32 of the channels 30 have undercut shapes that prevent any removal of the cut-outs from the channels; this helps to produce a resistant connection between the acoustically resistive layer 24 and the alveolar structure 26.

The invention claimed is:

1. A process for the production of an acoustic treatment panel that can be connected at a surface of an aircraft, or at a leading edge such as an air intake of an aircraft nacelle, whereby said panel comprises an acoustically resistive layer, at least one alveolar structure, and a reflective layer, as well as channels placed between said alveolar structure and the acoustically resistive structure, with the channels each being bordered by a wall, said process comprising:
  deforming a layer so as to produce furrows at one, surface of the layer;
  flattening and making integral said deformed layer with the acoustically resistive layer in such a way as to border the channels; and
  removing material in such a way as to eliminate at least a portion of a thickness of the layer in which the furrows are formed between the channels, prior to the assembly of the alveolar structure,
  wherein the removing material step is carried out after flattening and making integral said deformed layer with the acoustically resistive layer.

2. The process according to claim 1, wherein an entire thickness of the layer is removed between the channels.

3. The process according to claim 1, further comprising preserving two lugs at the layer that are essentially parallel to the acoustically resistive layer on either side of the channels.

4. The process according to claim 3, wherein the lugs have a length of between 2 and 10 mm.

5. The process according to claim 1, wherein the removal of material whose purpose is to eliminate a portion of the layer is done by water jet.

6. The process according to claim 1, wherein the assembly of the alveolar structure with the acoustically resistive layer that incorporates the channels is done by raising the temperature of the areas that are to be assembled and by injecting a pressurized gas into the channels so as to expand the walls of the channels so as to flatten them against the ends of the cells of the alveolar structure.

7. The process according to claim 6, further comprising making cut-outs with undercut shapes that can accommodate the channels at the surface of the alveolar structure that can be in contact with the acoustically resistive layer.

8. The process according to claim 7, wherein the cut-outs have a dovetail cross-section.

9. The process according to claim 1, wherein the layer is a sheet metal made of a titanium alloy.

10. The process according to claim 1, wherein the layer is shaped by using a super plastic shaping technique.

11. The process according to claim 1, wherein the layer is made integral with the acoustically resistive layer by a continuous line at each edge of each channel.

12. The process according to claim 2, further comprising preserving two lugs at the layer that are essentially parallel to the acoustically resistive layer on either side of the channels.

13. The process according to claim 2, wherein the removal of material whose purpose is to eliminate a portion of the layer is done by water jet.

14. The process according to claim 2, wherein the assembly of the alveolar structure with the acoustically resistive layer that incorporates the channels is done by raising the temperature of the areas that are to be assembled and by injecting a pressurized gas into the channels so as to expand the walls of the channels so as to flatten them against the ends of the cells of the alveolar structure.

15. The process according to claim 2, wherein the layer is a sheet metal made of a titanium alloy.

16. A process for the production of an acoustic treatment panel that can be connected at a surface of an aircraft, or at a leading edge such as an air intake of an aircraft nacelle, comprising:
deforming a layer so as to produce a plurality of furrows at one surface of the layer,
flattening and making integral said deformed layer with an acoustically resistive layer in such a way as to border a plurality of channels placed between an alveolar structure and an acoustically resistive structure, with the channels each being bordered by a wall; and
removing material in such a way as to remove and entire thickness of the layer in which the furrows are formed between the channels, prior to the assembly of an alveolar structure having a reflective layer,
wherein the removing material step is carried out after flattening and making integral said deformed layer with the acoustically resistive layer, and edges coming from either side of the furrows of the deformed layer are made integral with the resistive layer by a continuous line so as to ensure sealing between the channels and the rest of the panel.

17. The process according to claim 16, further comprising preserving two lugs at the layer that are essentially parallel to the acoustically resistive layer on either side of the channels.

18. The process according to claim 17, wherein the lugs have a length of between 2 and 10 mm.

19. The process according to claim 16, wherein the removal of material whose purpose is to eliminate a portion of the layer is done by water jet.

20. The process according to claim 16, wherein the assembly of the alveolar structure with the acoustically resistive layer that incorporates the channels is done by raising the temperature of the areas that are to be assembled and by injecting a pressurized gas into the channels so as to expand the walls of the channels so as to flatten them against the ends of the cells of the alveolar structure.

* * * * *